United States Patent
Simon et al.

(10) Patent No.: US 6,935,087 B2
(45) Date of Patent: Aug. 30, 2005

(54) METHOD AND APPARATUS FOR AUTOMATICALLY PACKING TUNA LOINS INTO PLASTIC BAGS

(75) Inventors: Frank Joseph Simon, Pueblo, CO (US); Otto H. Fischer, Irvine, CA (US)

(73) Assignee: Atlas Pacific Engineering Company, Pueblo, CO (US)

( * ) Notice: Subject to any disclaimer, the term of this patent is extended or adjusted under 35 U.S.C. 154(b) by 257 days.

(21) Appl. No.: 10/346,851

(22) Filed: Jan. 16, 2003

(65) Prior Publication Data

US 2005/0014459 A1 Jan. 20, 2005

Related U.S. Application Data

(60) Provisional application No. 60/350,254, filed on Jan. 18, 2002.

(51) Int. Cl.⁷ .......................... B65B 63/00; A21C 15/04
(52) U.S. Cl. .............................. 53/435; 53/438; 53/504; 53/517; 53/529; 100/39; 100/97
(58) Field of Search .................... 53/435, 438, 439, 53/459, 469, 473, 504, 517, 513, 514, 529, 530, 523, 570, 577, 258, 259, 284.7, 391; 100/39, 94–97

(56) References Cited

U.S. PATENT DOCUMENTS

| | | | | |
|---|---|---|---|---|
| 2,044,813 A | * | 6/1936 | Rooney | 53/438 |
| 2,926,095 A | * | 2/1960 | Gorby | 53/435 |
| 3,235,389 A | * | 2/1966 | Hertwig et al. | 53/438 |
| 3,717,973 A | * | 2/1973 | Brady, Jr. | 53/530 |
| 4,166,140 A | * | 8/1979 | Dutton et al. | 53/435 |
| 5,203,141 A | * | 4/1993 | Berciga et al. | 53/435 |
| 5,226,334 A | * | 7/1993 | Pegoraro | 83/42 |
| 5,401,156 A | * | 3/1995 | Anderson | 53/529 |
| 6,351,927 B1 | * | 3/2002 | Righele et al. | 53/435 |
| 6,622,458 B2 | * | 9/2003 | Fischer et al. | 53/435 |
| 2002/0187229 A1 | * | 12/2002 | Fischer et al. | 426/397 |
| 2003/0097819 A1 | * | 5/2003 | Fischer et al. | 53/435 |

* cited by examiner

*Primary Examiner*—Stephen F. Gerrity
(74) *Attorney, Agent, or Firm*—Bruce H. Johnsonbaugh

(57) ABSTRACT

A method and apparatus is provided for automatically forming raw tuna loins into homogenized, formed packets and packing those packets into bags for freezing and shipping to distant canning plants. A conveyed stream of raw tuna loins is tamped and compacted into a homogenized tuna stream of a predetermined height and width with dimensions compatible with processing equipment at the canning plant. A predetermined length of the homogenized tuna stream is measured and cut into packets and automatically packed into bags of predetermined size. In one embodiment, a servo controlled, intermittent advance conveyor is provided which is adapted to periodically advance said stream of raw tuna loins a distance which corresponds to the length of the bags into which the tuna is being packed. The apparatus for homogenizing the raw tuna loins is either a ski-shaped tamper driven by rotating cranks or a top belt including a pressure cylinder for urging the top belt into contact with the stream of raw tuna loins.

8 Claims, 10 Drawing Sheets

METHOD AND APPARATUS FOR AUTOMATICALLY PACKING TUNA LOINS INTO PLASTIC BAGS

CROSS-REFERENCE TO RELATED APPLICATION

This application claims the benefit of and priority from U.S. provisional application Ser. No. 60/350,254 filed Jan. 18, 2002.

BACKGROUND AND BRIEF SUMMARY OF INVENTION

The present invention relates generally to the automatic compacting, homogenizing and packing of tuna loins into plastic bags so that the loins can be frozen and shipped to canning plants. More particularly, the present invention provides a method and apparatus for automatically forming packets of homogenized tuna loins and packing the packets into elongated plastic bags in regions where the tuna are caught for shipment to distant canning plants.

At present, tuna that are caught in the waters of the central and western Pacific and the eastern Pacific are frozen soon after being caught. The frozen fish are thawed, cooked and typically cleaned by hand at local plants in Asia, Pacific Islands and South America, for example. The loins are thereafter hand packed into plastic wrappers, refrozen and shipped to distant canning plants in the United States, for example. At the canning plants, the frozen plastic wrapped loins are again thawed for processing. The thawed loins are then typically formed into product cake and packed into cans or pouches.

The prior art hand packing of raw loins for shipment includes several inefficiencies which the present invention overcomes. Hand packing is labor intensive and expensive. The hand packed loins are of various sizes, requiring further processing at the canning plant. The various size packages cause inefficient packing for shipment. The hand packed loins are not homogeneous, i.e., they tend to have air pockets and/or various densities and are not packed efficiently for shipment.

The present invention overcomes the above described problems by providing a method and apparatus for automatically packing the raw tuna loins. The loins are automatically formed into uniform sized packets compatible with the sizes used in the canning plants. The packets formed by the present invention are compacted and homogenized, i.e., having uniform density. The homogenized packets are automatically packed into uniform sized bags. The uniform sized bags are densely and fully packed to provide maximum efficiency in shipment. By forming packets of a size compatible with canning plant machinery, less processing is required at the canning plant and overall efficiency is maximized. The design of the packing equipment is simple as well as robust; allowing the equipment to be used at relatively remote locations.

The present invention provides a method and apparatus of simple but rugged design that replaces the step of hand packing of tuna loins into plastic wrappers for shipment to distant canning plants.

The apparatus is of simple, but rugged design, and capable of extended use with minimal repair and/or replacement of parts.

The present invention includes multiple advantages of packing the loins by machine versus the prior art hand packing.

The present invention achieves significant labor savings at the packing end since the automatic packing of the loins will significantly reduce the amount of necessary hand labor.

Another advantage is the tamped and homogenized tuna packed into bags is easier to handle at canning plants than the hand packed loins presently received by canning plants, and is also easier to ship. The homogenized tuna thaws out more uniformly at the canning plant than the hand packed tuna loins.

The present invention achieves significant space savings at the packing end due to the significant reduction of manual labor.

A significant advantage is that the present invention achieves an increased rate of filling and sealing the bags, increasing production while simultaneously achieving better quality.

An additional advantage of the invention is that the portion control is more uniform in that the bags are filled and metered simultaneously and automatically.

A further advantage is that loin and flake tuna are mixed in the same proportions as in a traditional cannery.

A further advantage is that smaller bags can be used because the machine filling of bags requires no clearance for hand placement otherwise required during the hand packing of the loins.

An additional advantage is that the vacuum operation requires less time because the loin is compressed and smaller bags are utilized.

An additional advantage is labor savings at the canning plants since the frozen packets at the packing end fit the filler infeed after thawing much better than did the hand packed tuna loins.

Further objects and advantages will become apparent from the following description and the drawings wherein:

DETAILED DESCRIPTION OF THE DRAWINGS

Figure 9:
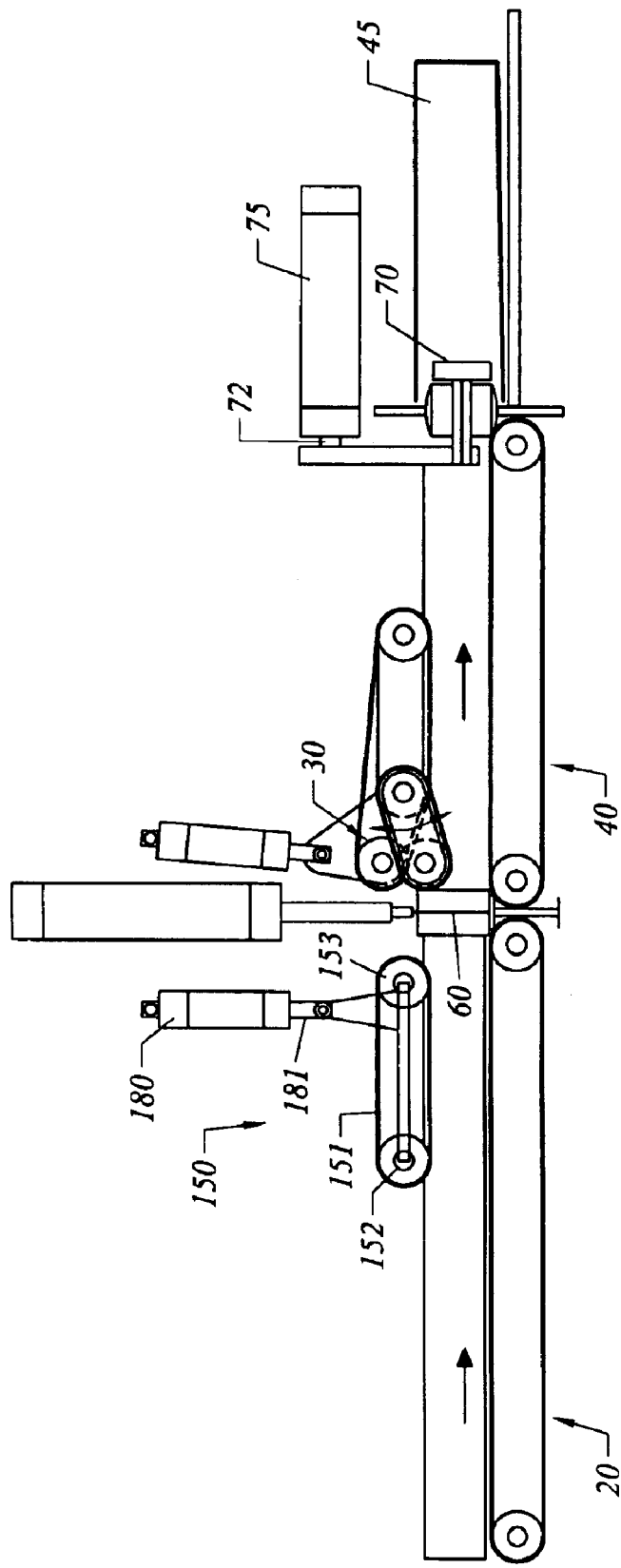
FIG. 9 is a schematic, side elevational view of an alternate embodiment of the invention using a top belt for tamping and homogenizing the incoming tuna loins.
Figure 10:
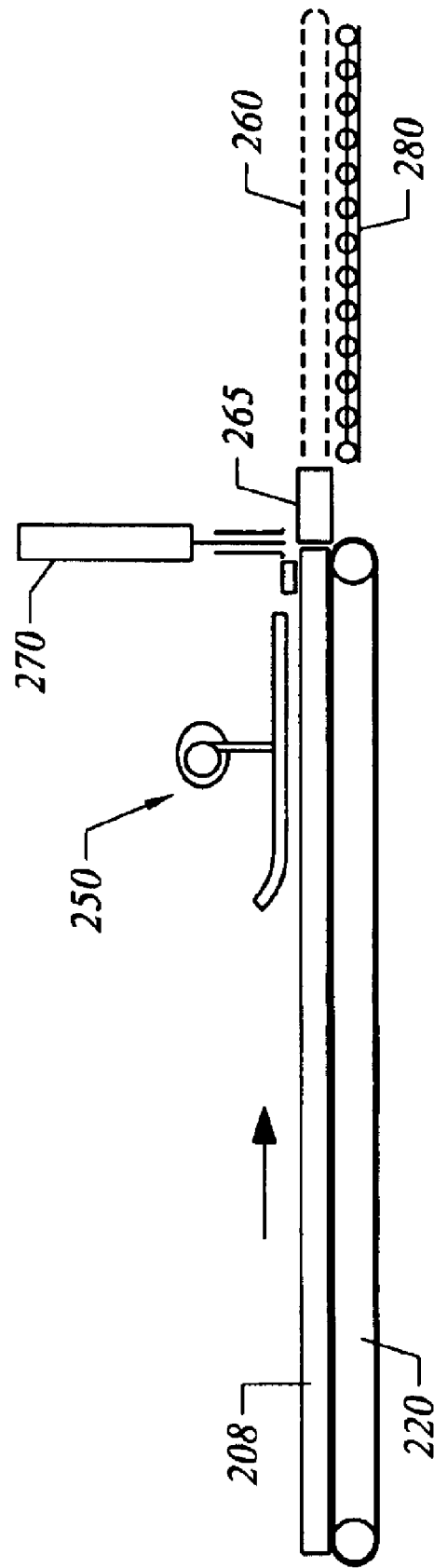
FIG. 10 is a schematic representation of a third embodiment of the invention.

FIGS. 1 through 8 illustrate the steps of operation of one embodiment of the present invention. FIGS. 9 and 10 illustrate alternate embodiments.

Figure 1:
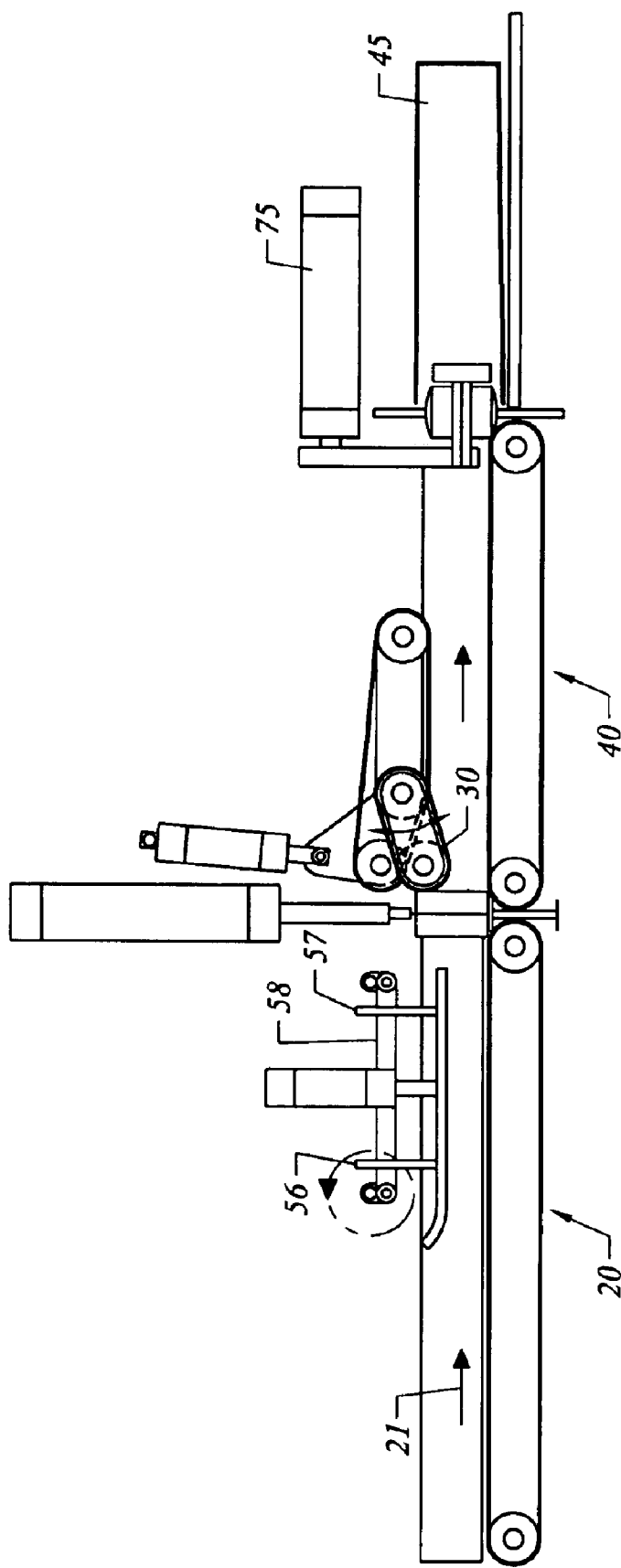
FIG. 1 is a side elevational view of the apparatus according to one embodiment of the invention before any tuna loins have been introduced.

FIG. 1 illustrates a continuous motion infeed conveyor 20 which operates to convey loins in the direction of arrow 21. Infeed conveyor 20 has a modulated speed depending on the position of adjustable roller 30. If roller 30 is in its lowermost position, the speed of infeed conveyor 20 is increased. If the position of roller 30 is in its uppermost position, the speed of infeed conveyor 20 is reduced. A second continuous motion conveyor 40 is provided which is positioned immediately downstream from infeed conveyor 20. Conveyor 40 is intended to convey the homogenized, uniformly sized packets into elongated plastic bags such as 45.

Figure 2:
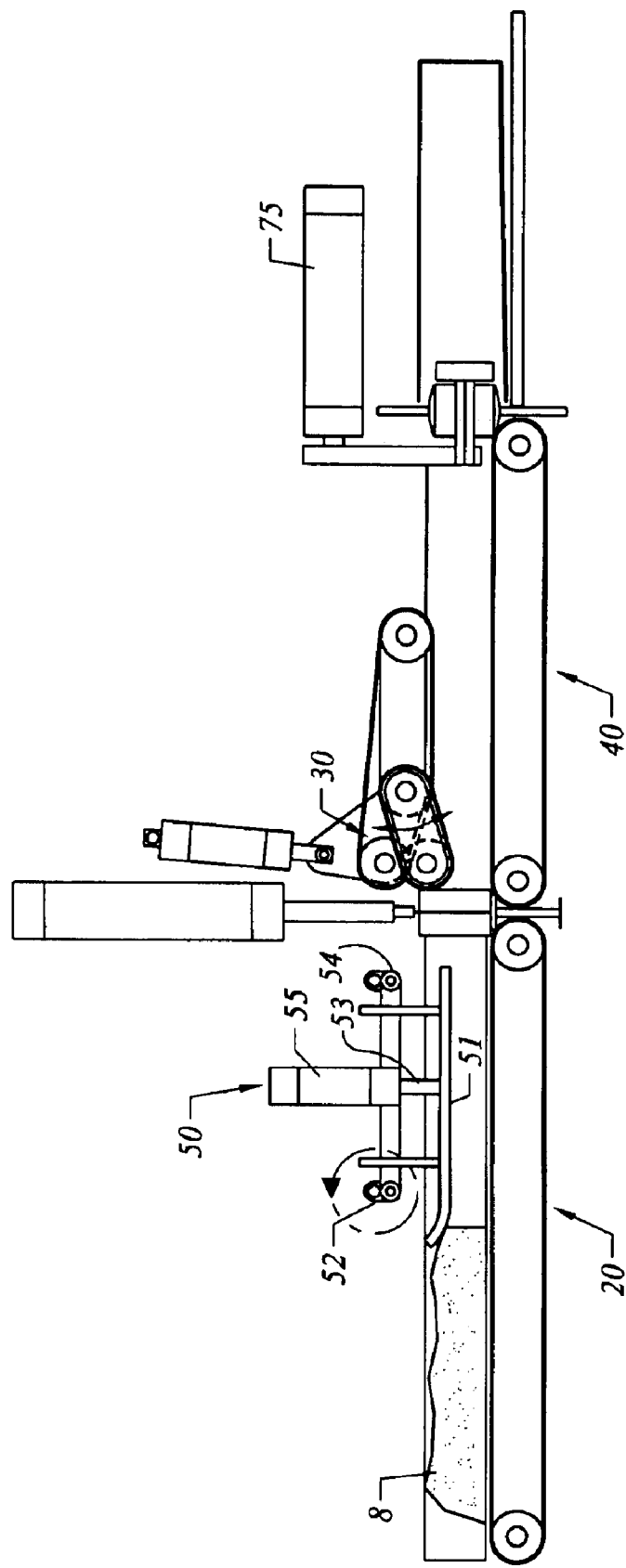
FIG. 2 is a side elevational view of the apparatus of FIG. 1, illustrating a stream of tuna loins being introduced on the infeed conveyor.

FIG. 2 illustrates a stream of incoming tuna loins 8 on infeed conveyor 20. The raw loins 8 are placed on infeed conveyor by hand. A tampering and homogenizing apparatus 50 is positioned over infeed conveyor 20 for the purpose of tampering, compacting and homogenizing the raw loins 8 into a more homogenous and densely packed tuna stream of a predetermined height and width illustrated as 9 in FIG. 3. The tampering and homogenizing apparatus includes a ski-shaped tamper 51 which is driven by two rotating cranks 52 and 54. A pressure cylinder 55 is positioned above the ski-shaped tamper 51. Pressure cylinder 55 has a vertically extending piston 53 connected to tamper 51 to maintain contact between tamper 51 and the incoming tuna loins. Tamper 51 is connected to drive cranks 52 and 54 by vertical, slotted support arms 56 and 57, which are in turn connected to a horizontal drive arm 58. Drive arm 58 is connected to cranks 52 and 54. The ski-shaped tamper 51 is therefore kept in contact with the upper surface of tuna loins 8 by pressure cylinder 55 interacting with slotted support arms 56 and 57. The cyclic motion of cranks 52 and 54 causes ski-shaped tamper 51 to repeatedly impact tuna loins 8 to tamper, compress and homogenize them illustrated as a homogeneous, densely packed stream 9.

Figure 3:
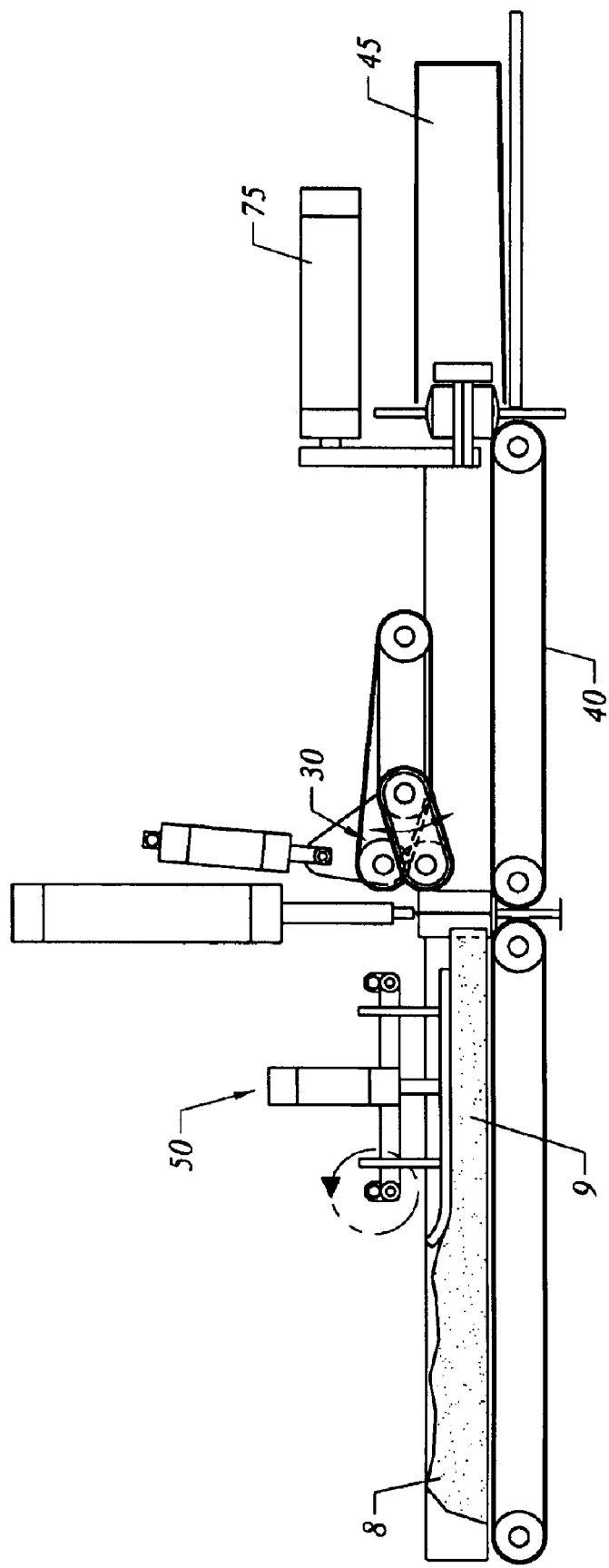
FIG. 3 is a side elevational view of the apparatus of FIGS. 1 and 2, wherein the stream of tuna loins is being tamped and homogenized.

FIG. 3 illustrates the incoming homogenized tuna stream 9 as it approaches the second conveyor 40.

Figure 4:
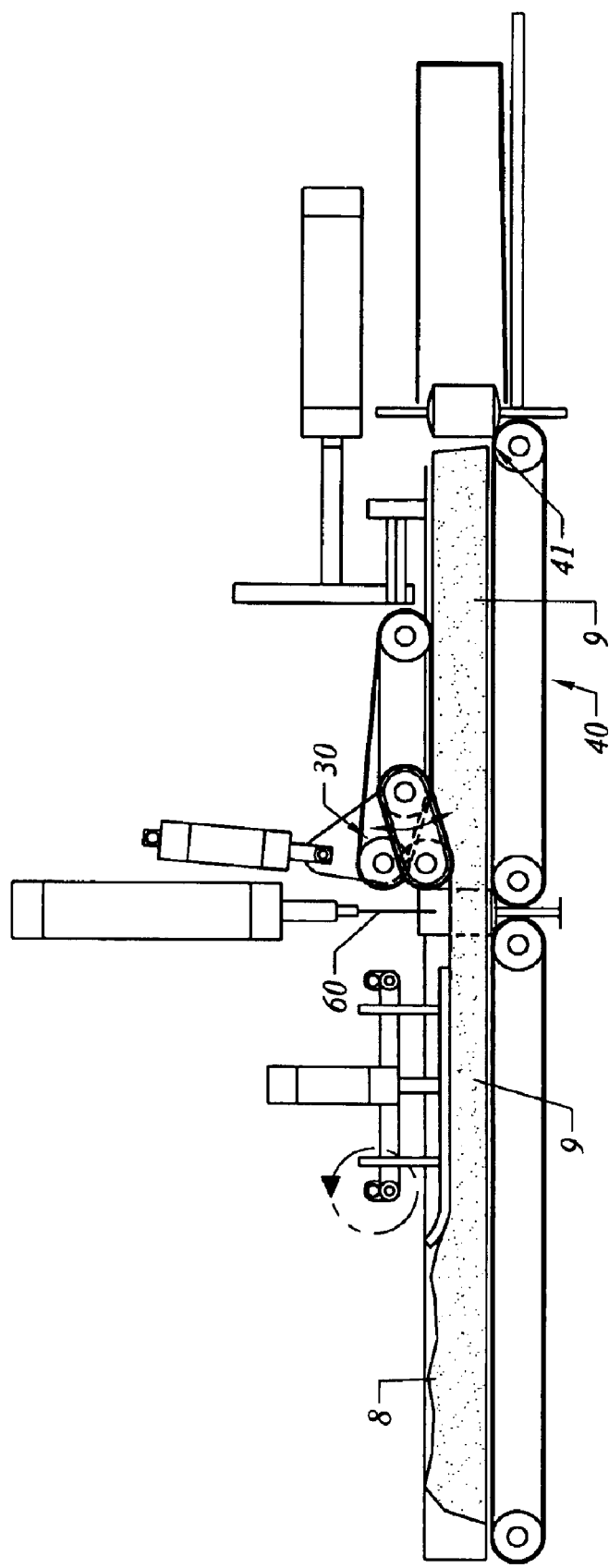
FIG. 4 is a side elevational view of the apparatus of FIGS. 1–3, showing the homogenized tuna stream as it is being metered prior to being cut.
Figure 5:
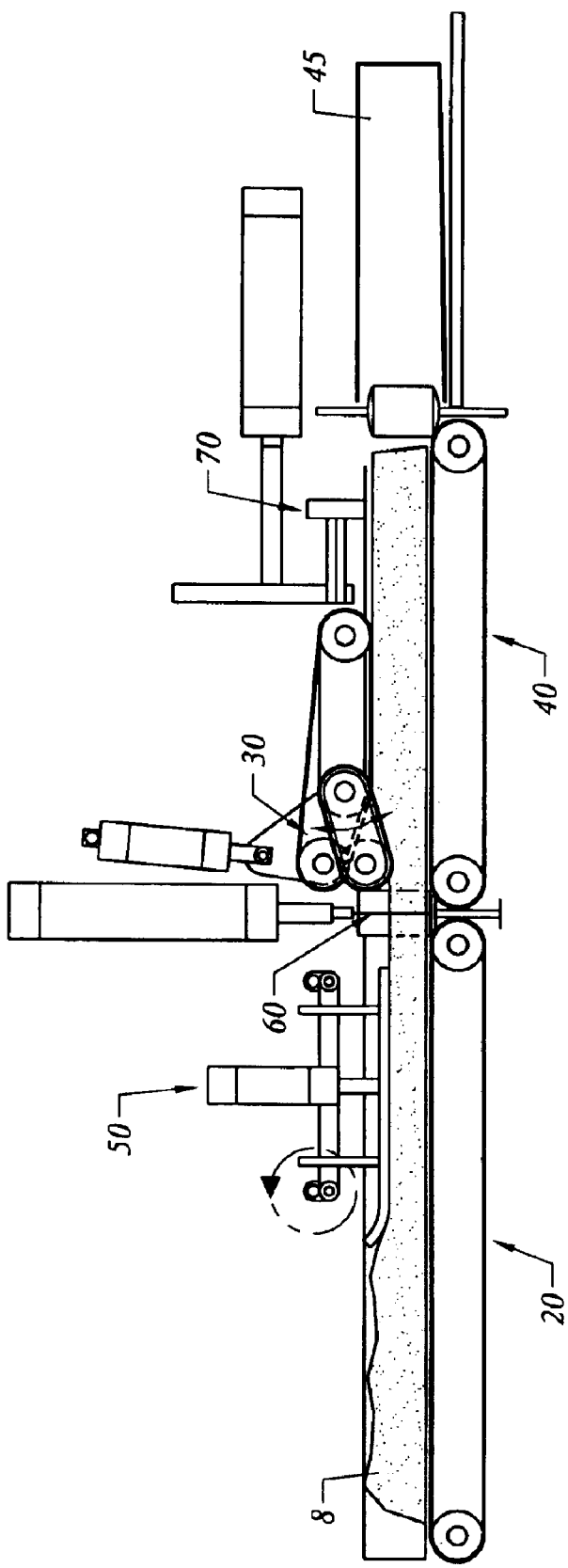
FIG. 5 is a side elevational view of the apparatus of FIGS. 1–4, showing the metering knife being actuated to sever a predetermined length of homogenized tuna stream and forming a packet.

FIG. 4 illustrates the tamped and homogenized tuna stream 9 as it reaches the downstream end 41 of conveyor 40. Roller 30 is utilized to meter the incoming flow of the homogenized tuna stream 9 and, when the predetermined length of homogenized tuna stream 9 has passed the metering knife 60, the metering knife 60 is actuated, as illustrated in FIG. 5, to cut a metered amount of tuna loin into a packet for eventual packing into elongated plastic bag 45.

Figure 6:
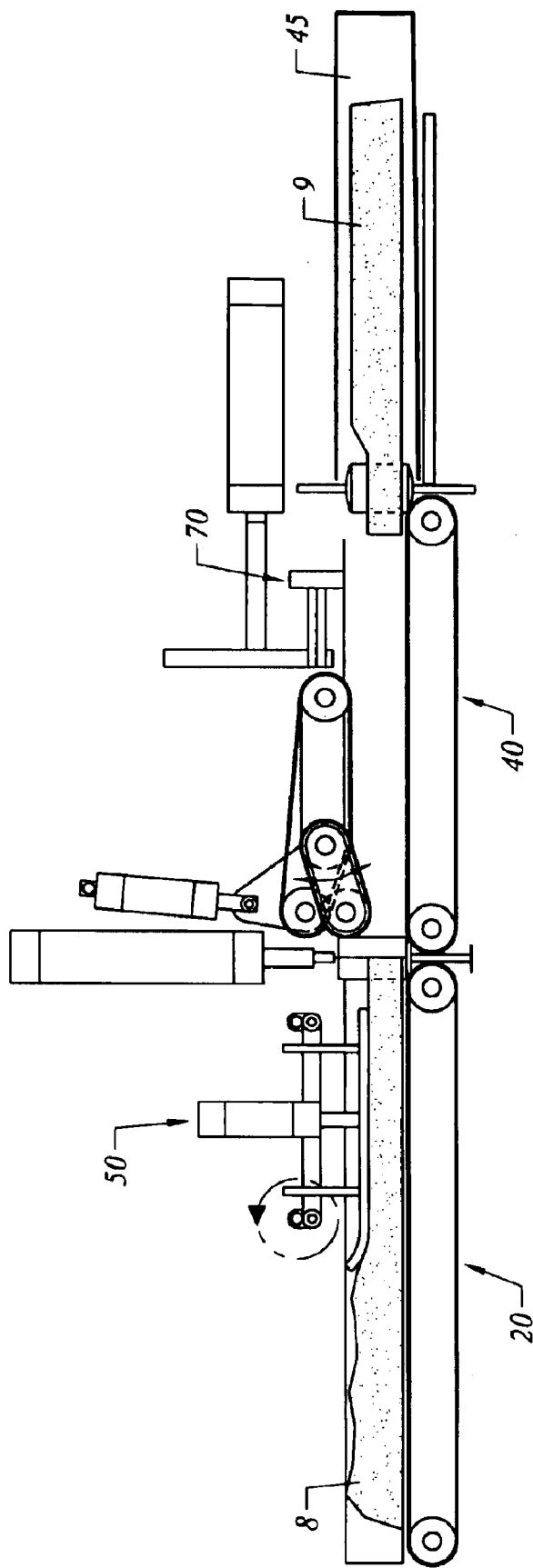
FIG. 6 is a side elevational view of the apparatus of FIGS. 1–5, showing the metered packet being fed into a bag.

As shown in FIG. 6, the infeed conveyor 20 is stopped and the secondary conveyor 40 conveys the packet of homogenized tuna 9 into bag 45. As shown in FIG. 6, the pusher 70 is in its upwardly retracted position to allow the packet of homogenized tuna loin 9 to pass into bag 45.

Figure 7:
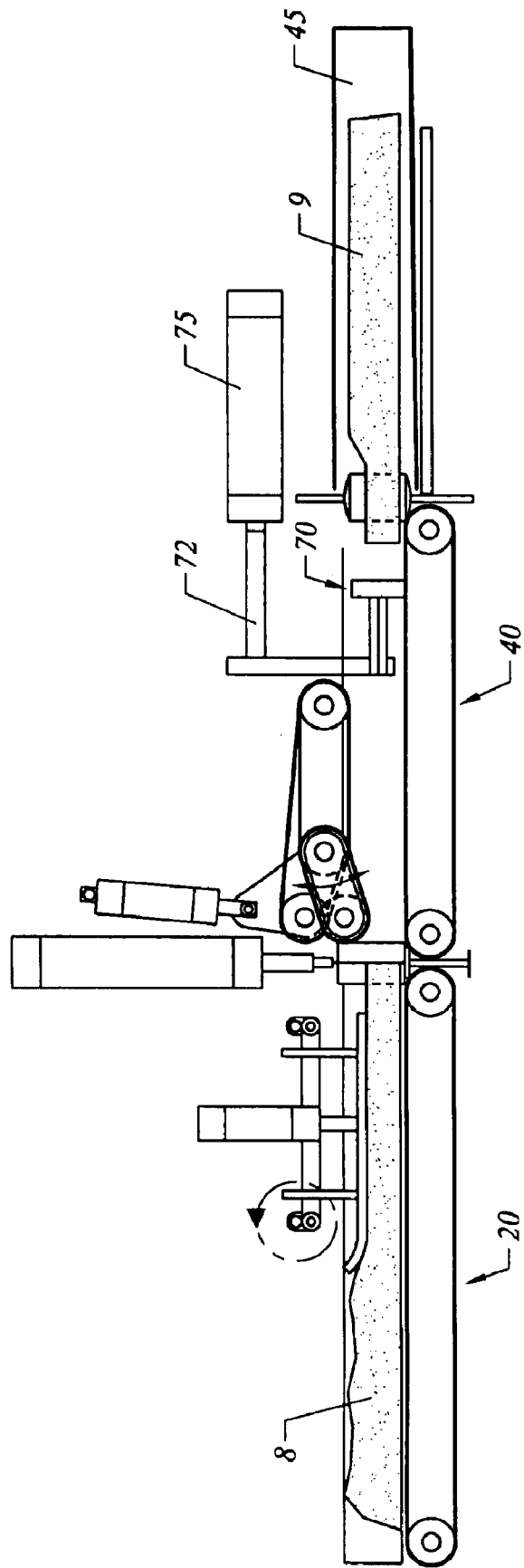
FIG. 7 shows the apparatus of FIGS. 1–6, wherein the homogenized and severed packet is about to be packed into the shipping bag.

As shown in FIG. 7, the pusher 70 is lowered into position adjacent the packet of homogenized tuna 9.

Figure 8:
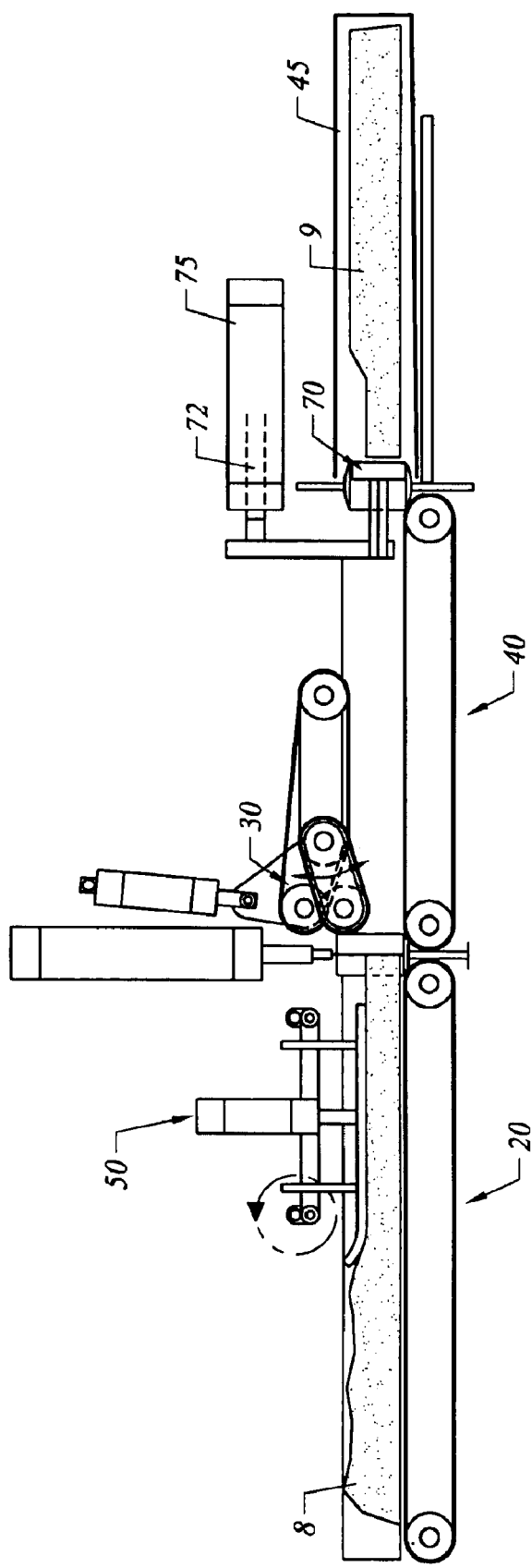
FIG. 8 is a side elevational view of the apparatus of FIGS. 1–7, showing the packet as it is being packed.

As shown in FIG. 8, the pusher 70 is actuated by drive cylinder 75 and cylinder rod 72 to force the homogenized packet completely into bag 45. The elongated plastic bag 45 is then sealed. The packet is then refrozen for shipment to a canning plant in the United States, for example.

FIG. 9 illustrates an alternate embodiment of the invention wherein the tampering and homogenizing apparatus 150 is a top belt 151. All other components of the invention are as shown in FIGS. 1–8 and described above. A description of those identical components is not repeated in the interest of brevity. Top belt 151 has a front roller 152 which rotates about axis A and a rear roller 153. A pneumatic cylinder 180 has a piston 181 which is used to create a desired load on belt 151. The load created on belt 151 is utilized to tamp and homogenize the raw loins to create a homogeneous and densely packed stream of tuna loins.

FIG. 10 illustrates an additional embodiment of the invention. An intermittent advance conveyor 220 is provided which utilizes a servo advance set to the same length as the bag length. For example, if a three foot bag is being used, the servo controlled feed conveyor 220 is set to utilize a three feet advance. In operation, the tuna loin 208 is advanced the fixed distance of, for example, three feet. As the tuna loin 208 is being advanced in the direction of the arrow shown, it is compressed by a tamping mechanism 250 which in its simplest form is a walking shoe driven by an eccentric. The three feet length of the homogenized tuna stream advances into a bag 260 shown in dashed lines that illustrate the expanded position of the bag. The bag 260 is supported by and compressed on the bag shoe 265 and is allowed to expand as the homogenized tuna stream advances and fills the bag. After the advancing length of homogenized tuna stream 208 fills up the bag 260, the infeed conveyor 220 is stopped. The next step is knife 270 is actuated and severs the proper length of the homogenized tuna stream into a packet in bag 260. Bag 260 is carried on a roller conveyor 280. The final portion of the packet that remains in the bag shoe 265 is drawn into the bag 60 as it is pulled off the shoe. The compressed tuna packet will act as a single unit if the loins are interlocked. The filled bag 260 is then advanced to another station where it is subjected to a vacuum and then sealed.

The foregoing description of the invention has been presented for purposes of illustration and description and is not intended to be exhaustive or to limit the invention to the precise form disclosed. Modifications and variations are possible in light of the above teaching. The embodiments were chosen and described to best explain the principles of the invention and its practical application to thereby enable others skilled in the art to best use the invention in various embodiments and with various modifications suited to the particular use contemplated. The scope of the invention is to be defined by the following claims.

What is claimed is:

1. A method for automatically forming raw tuna loins into homogenized, formed loin packets and packing said packets into bags to be frozen and shipped to canning plants, comprising the steps:

tamping and compacting an automatically conveyed stream of raw tuna loins to form said raw tuna loins into a homogenized tuna stream of a predetermined height and width;

metering a predetermined length of said formed, homogenized tuna stream;

cutting said predetermined length of said formed, homogenized tuna stream into packets; and automatically packing said packets into bags of predetermined size.

2. The method of claim 1 wherein said metering step is accomplished by a servo controlled, intermittent advance conveyor which periodically advances said stream of raw tuna loins a fixed distance which corresponds to the length of said bags into which the tuna packets are being packed.

3. The method of claim 1 wherein said tamping and compacting is performed by a ski-shaped tamper actuated by at least one rotating crank.

4. Apparatus for automatically forming raw tuna loins into homogenized, formed packets and packing said packets into bags to be frozen and shipped to distant canning plants, comprising:

infeed conveyor means for conveying a stream of raw tuna loins;

tamping and compacting means for forming said stream of raw tuna loins into a homogenized tuna stream of a predetermined height and width;

metering means for measuring predetermined lengths of said homogenized tuna stream;

metering knife means for cutting said predetermined lengths of said homogenized tuna stream into packets; and automatic packing means for packing said packets into bags.

5. The apparatus of claim 4 wherein said tamping and compacting means comprises a ski-shaped tamper driven by two rotating cranks.

6. The apparatus of claim 4 wherein said tamping and compacting means comprises a top belt carried by a front and rear roller and further comprising a pressure cylinder for applying a load urging said top belt into contact with said stream of tuna loins.

7. The apparatus of claim 4 wherein said tamping and compacting means comprises a walking shoe carried by and driven by an eccentric drive.

8. The apparatus of claim 4 wherein said bags are of a predetermined length and wherein said metering means is a servo controlled, intermittent advance conveyor adapted to periodically advance said stream of raw tuna loins a distance which corresponds to the length of said bags into which the tuna is being packed.

* * * * *